March 28, 1961   J. E. STERN ET AL   2,976,721
TWO COMPONENT PALLOGRAPH
Filed Dec. 14, 1956   6 Sheets-Sheet 3

INVENTORS
JESSE E. STERN
GABRIEL L. SANTORE

BY  B. L. Zangwill
ATTORNEY

March 28, 1961 J. E. STERN ET AL 2,976,721
TWO COMPONENT PALLOGRAPH
Filed Dec. 14, 1956 6 Sheets-Sheet 4

INVENTORS
JESSE E. STERN
GABRIEL L. SANTORE
BY
B. L. Zangwill
ATTORNEY

United States Patent Office

2,976,721
Patented Mar. 28, 1961

2,976,721

TWO COMPONENT PALLOGRAPH

Jesse E. Stern, Hyattsville, Md., and Gabriel L. Santore, Washington, D.C., assignors to the United States of America as represented by the Secretary of the Navy Filed Dec. 14, 1956, Ser. No. 628,473

1 Claim. (Cl. 73—71)

(Granted under Title 35, U.S. Code (1952), sec. 266)

The invention described herein may be manufactured and used by or for the Government of the United States for governmental purposes without the payment of any royalties thereon or therefor.

This invention relates to a vibration measuring instrument, and more particularly to a measuring instrument capable of simultaneously detecting vibrations in two planes, and measuring and recording both the frequency and displacement of said vibrations.

Vibration measuring instruments conventionally consist of a fairly rigid case adapted to be placed upon the structure whose vibrations it is desired to measure, said case containing a spring supported weight, usually referred to as a seismic mass, and a means for recording the magnitude and frequency of the relative motion between the mass and the case. The recording means generally consists of a piece of paper, or the like, adapted to move relative to a scriber connected either directly or by suitable linkage to the aforementioned mass. The paper is usually wax coated or otherwise rendered sensitive to having marks made thereon by said scriber. It is pointed out that in accordance with usual practice, it is actually the case that is moved by hte vibrations being measured, and the weight contained therein moves relative to said case. The machine is so calibrated that the marks recorded on the paper represent a scale version of the vibrations being measured. By suitable auixilary equipment it is possible to record the vibrations per unit time; therefore the conventional vibration measuring instrument gives an indication of the presence of vibrations, the frequency thereof, and the magnitude of said vibrations.

The prior art devices of the type described above are commonly known as pallographs. The pallograph is usually provided with a case, having a mass pivotally mounted therein in a manner similar to a pendulum, that is, the mass is mounted at one end of a lever having its opposite end pivotally connected to the case. The mass and lever are held in a neutral position by one or more springs of a suitable form, the mass and lever being adapted to move relative to the case when said case is subjected to vibration. Further, a pallograph usually includes a system of mechanical linkages to obtain a desired magnification of the movement of the mass, and a means for recording said magnified movement on suitable paper by means of a scriber connected, through said linkage, to said mass.

One disadvantage of the prior art pallographs is that each instrument usually employs an extremely heavy seismic mass and in addition requires certain auxiliary timing equipment that is employed in conjunction with the recording means. The combination of a large mass, and the auxiliary timing equipment results in an instrument having a very considerable weight and size, the weight being in the neighborhood of 75 lbs. A further disadvantage of the prior art devices is that, as a rule, they are capable of measuring vibrations occurring in only one plane relative to the case of the instrument, i.e., either horizontal or vertical vibrations only. Thus it is necessary to have two or more separate instruments when it is desired to measure vibrations occurring in more than one plane, or where it is desired to resolve vibrational motion into its vertical and horizontal components. By convention, pallographs are divided into two categories, namely, one type for measuring horizontal movements and another for measuring vertical movements, therefore, when it is desired to measure both movements simultaneously, it is necessary to employ two separate instruments each of which weighs about 70 lbs. and occupies about 162 square inches.

Furthermore, the combined size of two instruments raises another disadvantage in that, it is necessary for said instruments to occupy a considerable area, thereby rendering it difficult to measure both horizontal and vertical vibrations at any one fairly small area. It is pointed out that when it is desired to measure both horizontal and verical vibrations the combined weight of the necessary instruments is about 135 lbs., and said instruments occupy a combined area of approximately 324 square inches. It should be quite apparent that such instrumentation is quite cumbersome and heavy, usually requiring more than one person to carry the instruments around and place them in suitable position.

An object of this invention is to provide a device adapted to overcome the weight and size disadvantages of the prior art devices described above.

An additional object of this invention is to provide a pallograph that is capable of simultaneously measuring and recording two components of vibration.

A further object of this invention is to provide a two component pallograph that is capable of simultaneously measuring vibrations in two directions, yet has a weight and size less than that of prior art single component pallographs.

A still further object of this invention is to provide a pallograph that is capable of measuring two components of vibration either simultaneously or individually.

Another object of this invention is to provide a pallograph that is capable of simultaneously measuring two components of vibration and yet is considerably smaller in size and weight than the comparable prior art equipment, without an ensuing loss of either frequency response or capacity of measurement.

Still another object of this invention is to provide a two component pallograph with vibration sensing and recording means that are of a very sensitive nature and have a low coefficient of friction.

In accordance with this invention, a base member has attached thereto, a pair of movable masses. One mass is attached to a normally horizontal lever adapted to pivot about a horizontal axis, and the other mass is attached to a substantially vertical support adapted to pivot about a second horizontal axis, said levers extending at substantially 90 degrees to one another. The mass attached to the horizontal lever is adapted to move when the base member is subjected to vertical vibrations, that is, up and down movements, and the other mass is adapted to move when the base is subjected to substantially horizontal vibrations. The instrument is also provided with a pair of scribers, each of which is pivotally connected to one of the masses and is adapted to move in response to the movement of said mass. Each scriber comprises a heated stylus adapted to bear against a heat sensitive strip of paper, means being provided to move said strip of paper relative to said stylus, whereby the heated styli may rub against said paper when movement thereof is brought about by movement of the respective masses. The instrument also includes a third, heated stylus adapted to be moved at predetermined intervals of time, transversely of said paper so as to leave a timing mark on said paper to denote the passage of a given interval of time, said latter stylus being actuated by the combination of a synchronous motor and a cam connected to said motor; the cam periodically shifting the stylus transversely of the direction of movement of the paper.

The following table shows a comparison of the physical specifications of the prior art single-component pallograph devices with those of the instant two-component pallograph which forms the subject of this invention:

22 formed either by welding together a plurality of suitably sized and shaped plates, or by casting. The base member 22 is provided with an upper horizontal, surface 24 and a forwardly extending portion 26, said forwardly extending portion 26 having an upper, flat horizontal surface 28. The pallograph base 22 is also provided with a ledge 30 at the left hand side thereof, as viewed in Fig. 1.

As previously pointed out the instrument is provided

| Name | Type H Pallograph | Type V Pallograph | Instant 2-component Pallograph |
|---|---|---|---|
| Practical Frequency Range, c.p.m. | 120–1,800 | 60–1,800 | 80–2,100. |
| Practical Single Amplitude Range, mils | 1–250 | 1–250 | 1–100. |
| Sensitivity or Magnification | Adjustable 2, 4, or 6 | Adjustable 2, 4, or 6 | Fixed 5. |
| Direction of Vibration | Horizontal | Vertical | Horizontal and Vertical. |
| Method of Detection | Seismic pendulum, mechanical lever. | Seismic pendulum, mechanical lever. | Seismic pendulum, mechanical lever. |
| Natural Frequency of Element, c.p.m. | 40 | 20 | 40. |
| Weight, pounds | 60 | 75 | 30. |
| Overall Dimensions (L x W x H) or (D x H), inches. | 18 x 9 x 11½ | 18½ x 9½ x 14½ | 13 x 8 x 11¹¹⁄₁₆. |
| Power Required | 110-v. A.C. | 110-v. A.C. | 115-v. A.C. |
| Accessory Equipment Required | Synchronous timer | Synchronous timer | None. |
| Method of Mounting on Vibrating Structure. | Set on, bolted or clamped to structure. | Set on, bolted, or clamped to structure. | Set on, bolted, or clamped to structure. |

By examining the preceding table it will be noted that the instant two-component pallograph produced in accordance with this invention combines into a single instrument, the response characteristics and vibration measuring facilities previously obtainable only by the use of two separate instruments. Furthermore, the instant two-component pallograph weighs only 30 lbs., compared to a weight of 135 lbs. (plus the weight of auxiliary timing equipment) for the equipment previously needed for carrying out two-component measurements.

Other objects and many of the attendant advantages of this invention will be readily appreciated as the same becomes better understood, by reference to the following detailed description when considered in connection with the accompanying drawings wherein—

Fig. 2 is a plan view of the pallograph constructed in accordance with this invention, with the top portion removed;

Figure 1:
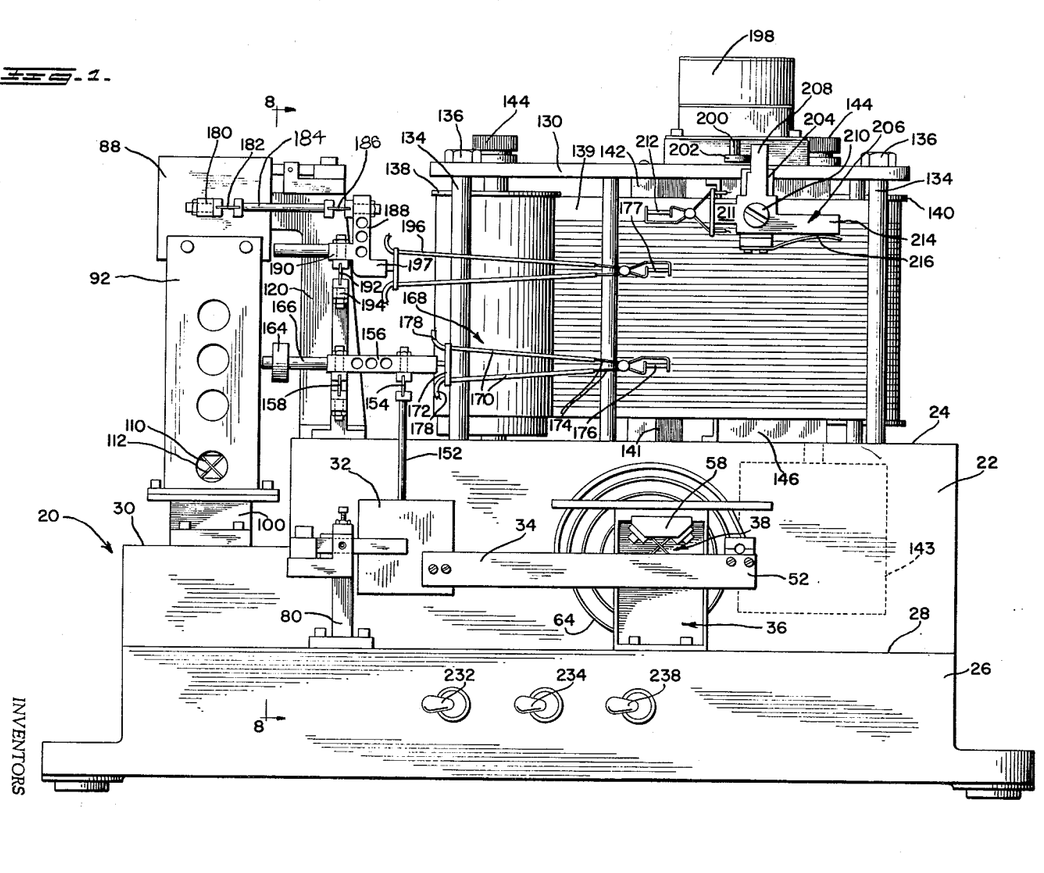
Fig. 1 is an elevational view of a two channel pallograph constructed in accordance with this invention.

Referring now to the drawings, wherein like reference characters designate like or corresponding parts throughout the several views, there is shown in Fig. 1 an elevational view of a vibration measuring instrument constructed in accordance with this invention, said instrument being hereinafter referred to as a pallograph 20.

The pallograph 20 comprises a hollow base member with seismic masses that are sensitive to vertical vibrations and horizontal vibrations respectively. A vertically sensitive seismic mass and accompanying structure, are situated on the flat surface 28 on ledge 26. The vertically sensitive instrumentality comprises a seismic mass 32 having one end of a lever 34 bolted thereto adjacent one of its sides. Said lever is pivotally connected to a vertical post 36 by means of a pair of flexure pivots 38.

Figure 7:
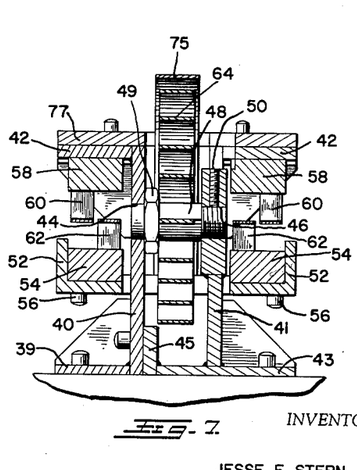
Fig. 7 is a vertical sectional view taken on line 7—7 of Fig. 4.
Figures 8, 10:
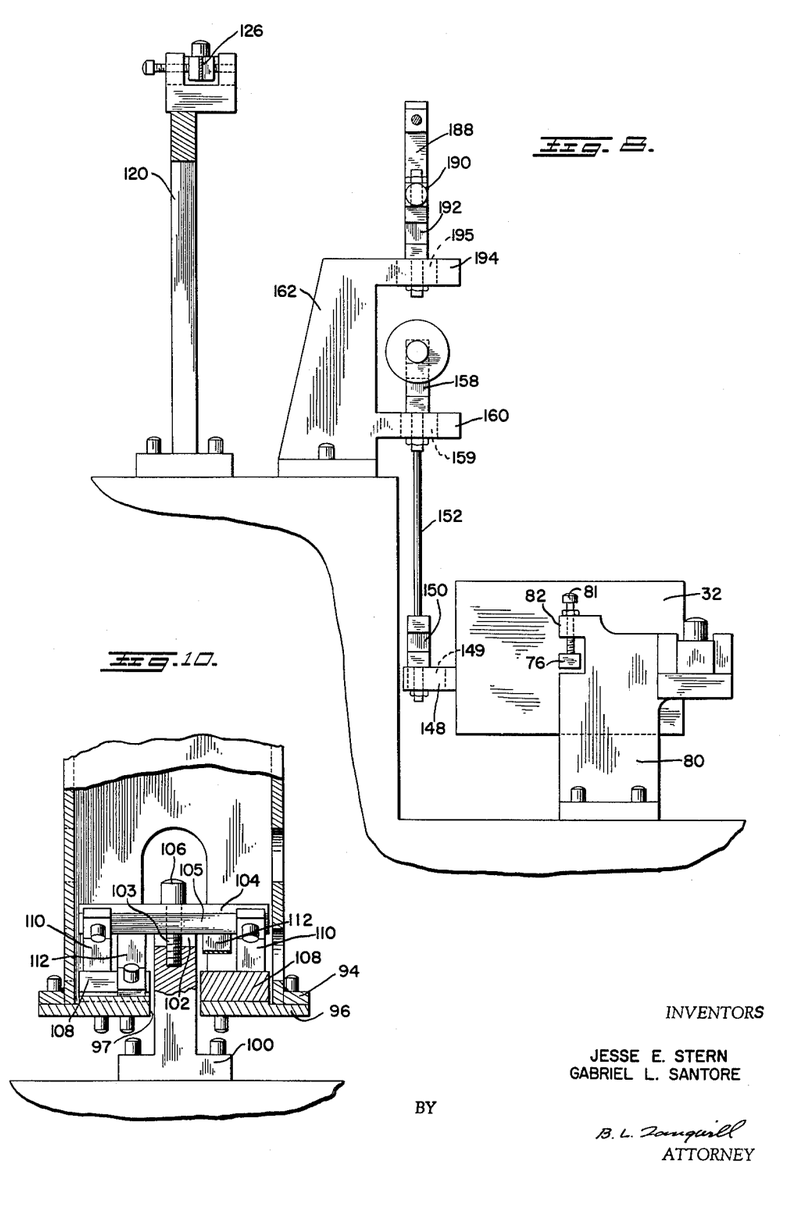
Fig. 8 is a sectional view taken on line 8—8 of Fig. 1.
Fig. 10 is a side view, on an enlarged scale, of a portion of the structure shown in Fig. 9.
Figure 9:
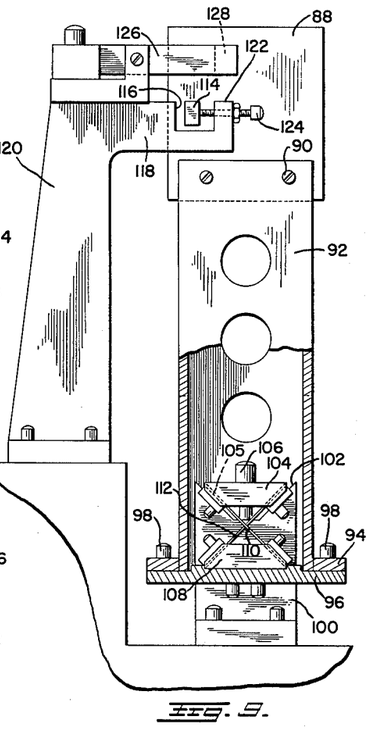
Fig. 9 is a front elevational view of a portion of the pallograph, partially broken away and in section.

The post 36 is composed of a front, vertical plate 40 having a horizontal plate 39 welded to its lower edge, and a rear vertical plate 41, said plates 40 and 41 being parallel. The rear plate 41 has a horizontal plate 43 welded to its lower edge, said horizontal plate 43 having a vertical plate 45 welded to its forwardmost edge. The plate 45 is parallel to both plates 40 and 41 and is adapted to abut plate 40, as shown in Fig. 7. The plate 40 has an unthreaded hole 44 extending therethrough, and plate 41 has a threaded hole 46 extending through it, said holes being in alignment with one another.

Prior to fastening plates 40 and 41 to the base 22, stud 48, one end of which is threaded, is screwed into the threaded hole 46 in vertical plate 41, after which, the opposite end of the stud is placed in hole 44 in plate 40. At this point plate 40 is bolted to plate 45 and both vertical plates 40 and 41 are bolted to the base of the instrument.

The vertical plates 40 and 41 are bolted to the base portion 26 by suitable bolts that extend through plates 39 and 43 respectively, and are screwed into suitably threaded holes in the horizontal plate 28.

The stud 48 is provided with a nut member 49, rigidly affixed thereto, said nut 49 facilitating rotation of said stud after the post assembly 36 has been bolted in place. A set screw 50 is screwed into a threaded hole in plate 41 and is adapted to bear against the threaded portion of the stud 48, so as to prevent rotation of said stud.

Each of the plate members 40 and 41 has a horizontal plate 42 welded to its upper edge, each of said plates 42, extending outwardly of the space between the front and rear plates 40 and 41, and having a function hereinafter described.

Figure 4:
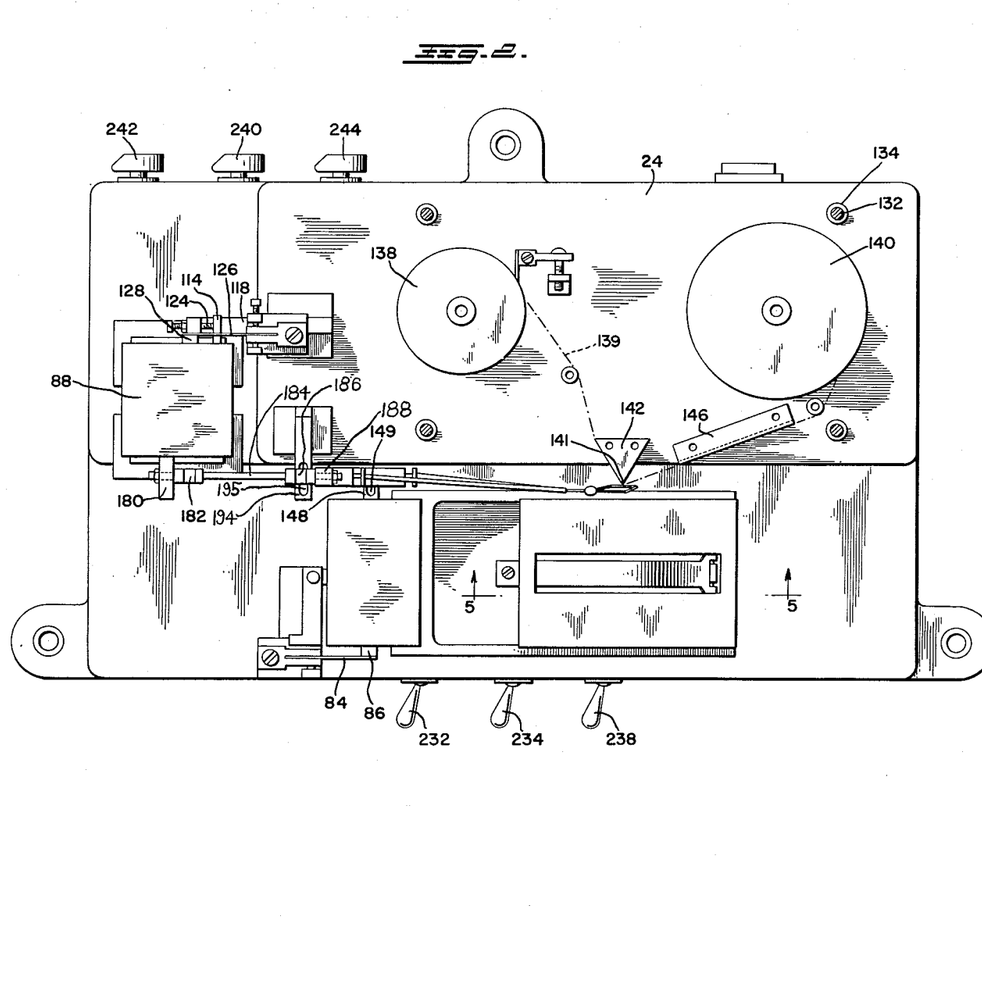
Fig. 4 is an elevational view, on an enlarged scale, of the portion of the structure shown in Fig. 1 and is partially broken away and in section.
Figure 5:
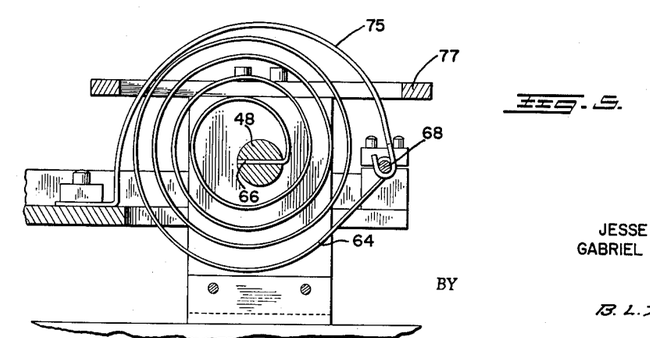
Fig. 5 is a sectional view taken on line 5—5 of Fig. 2.
Figure 6:
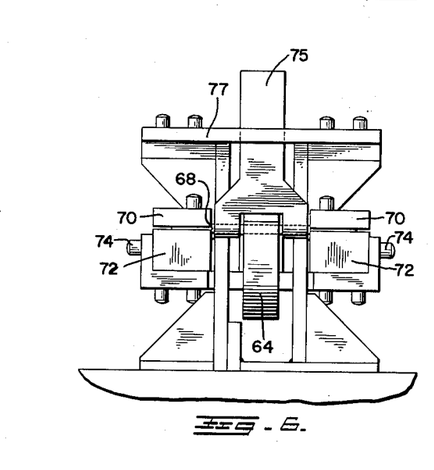
Fig. 6 is a side view of a portion of the structure, as taken on line 6—6 of Fig. 4.

The right hand end of lever 34, as viewed in Figs. 1 and 4, is connected to the vertical post 36 by means of a pair of flexure pivots 38 referred above. The right hand end of the lever 34 consists of a pair of transversely spaced parallel arms 52 that straddle the post 36. The upper side of each arm 52 has a flexure supporting block 54 fixedly connected thereto by a pair of screws 56; the right and left hand ends of each block 54 being beveled.

Directly opposite each block 54, on the under side of each horizontal plate 42 is a substantially identical flexure supporting block 58 fixedly connected to said horizontal plate, each of said blocks 58 having its right and left hand ends beveled in exactly the same manner as the blocks 54.

Each of the flexure connections 38 consists of a first strip 60 of spring-type steel that extends from the beveled left hand end of the block 54 to the beveled right hand end of the block 58 and is held in fixed contact with each of the respective blocks by a clamping block 63 superimposed on the end portion of each steel strip, and held in place by a screw 65 that extends through the clamping block and steel strip and is screwed into a threaded hole in the respective flexure supporting blocks 54 and 58. A second strip of steel 62 is positioned laterally of the strip 60 and extends at substantially right angles thereto. The respective ends of strip 62 are connected to the right hand beveled end of block 54 and the left hand beveled end of block 58 in the same manner that the ends of strip 60 are connected to blocks 54 and 58.

It is pointed out that the flexures 38, 38 provide a frictionless pivotal connection between the lever 34 and the vertical post 36.

In addition to acting as a pivotal connection, the flexures 38, 38 act as a partial means for restoring the seismic mass to a neutral position, upon the movement of the same away from said neutral position. However, the major portion of the mass restoring force is provided by a spiral spring 64. The innermost end 66 of the spring 64 is immovably anchored within a slot provided in stud 48. The outermost end of the spiral spring 64 is anchored about a pin 68 that has its opposite ends removably clamped between a pair of blocks 70 and 72, fixedly connected to each of the arms 52 on lever 34, by means of suitable bolts or the like 74. The pin 68 is clamped between the respective pairs of blocks 70 and 72 by means of screws extending through each block 70 and threaded into the cooperating block 72. Since the stud 48 is fixedly attached to the post 36, the inner end 66 of the spring 64 is fixed and any movement of the lever arm 34 and the seismic mass 32 will be resisted by the action of the outermost end of spring 64 on pin 68, which in turn is fixedly attached to the lever arm 34.

The spiral spring 64 is shielded from above by an inverted U-shaped resilient guard 75 having its respective ends clamped to the pin 68 and the lever arm 34. The upper portion of the spiral spring 64 and the shield 75 both extend through a slot formed in a plate 77 bolted to the upper portion of the post 36, being directly connected to the respective horizontal plates 42 connected to the upper ends of the plates 40 and 41 respectively.

A locking means is provided for locking the seismic mass 32 against movement while the instrument is being moved from place to place. The locking means comprises an extension piece 76 affixed to the left hand face of the seismic mass 32, and adapted to move vertically within a slot 78 provided in a vertical post 80 fixedly mounted on the horizontal surface 28 of the base member 22. A locking screw 81 extends through a finger 82 defining the upper end of the slot 78, said locking screw 81 being adapted to be rotated as to be brought to bear against the extension piece 76 and press the same against the lower end of slot 78, thereby locking piece 76, and therefore the seismic mass 32, against vertical movement.

A damping member, comprising a horizontal flexible strip 84, is clamped to the post 80 and extends along the side of seismic mass 32. A pad 86 of resilient material is affixed to the right hand end of the strip 84, said pad being adapted to bear against the side of seismic mass 32 and act as a motion damping means. It is pointed out that the damping pad 86 may be moved out of contact with the mass 32, if so desired.

The pallograph 20 is provided with a second seismic mass 88 adapted to move in a direction substantially parallel to the base 22 in response to vibrations in a horizontal plane. The seismic mass 88, is held by screws 90 to a vertical, tubular post 82. The lower end of the tubular post 92 is provided with an outwardly extending flange 94. A plate 96, having an opening 97 therein, extends across the lower end of the vertical post 92 and is clamped to the flange 94 by bolts 98 extending through flange 94 and threaded into the plate 96. A vertical bracket 100 is fixedly mounted on the horizontal ledge 30 at the base of the pallograph, said post 100 extending at substantially right angles to the post 80. The vertical post 100 extends into the hollow, mass supporting post 92 through the hole 97 in plate 96. The upper end of the bracket 100 is provided with a substantially V-shaped cutout area 102, said cutout area having a substantially horizontal lower surface, from which, a threaded hole 103 extends downwardly into the bracket 100. A horizontal plate 104 extends transversely of the vertical bracket 100 and has beveled longitudinal side edges 105 complementary to the sloping sides of the cutout area 102. The block 104 is clamped to the vertical post 100 by means of a screw 106 that extends through a hole in the center of the block 104 and is screwed into the hole 103 provided in the lower end of the V shaped cutout 102.

A pair of blocks 108 are fixedly connected to the inner surface of the plate 96, within the vertical post 92, and at opposite sides of the vertical bracket 100. Each of the blocks 108 has its opposite ends beveled toward the top, center portion thereof. At each side of the bracket 100, one spring-like strip of metal 110 extends from one beveled end of a block 108, to a diagonally opposite beveled edge 105 of the block 104. At the same side of the bracket 100, a second spring-like strip of metal 112 extends from the opposite end of the same block 108 to the diagonally opposite beveled edge 105 of block 104. The opposite ends of each of the strips 110 and 112 are clamped to the respective blocks 104 and 108 by screws passing through said strips and screwed into threaded holes in said respective blocks. An identical connection between blocks 104 and 108 is found at the opposite side of the bracket 100. The combination of flexure strips 110 and 112, connected in the manner described above, forms a frictionless pivotal connection between the vertical, tubular post 92 and the vertical bracket 100.

A locking means is provided for the seismic mass 88 in order to prevent accidental movement of said mass during movement of the instrument from one place to another. The locking means includes a member 114 extending rearwardly of the seismic mass 88 and adapted to move from side to side within a slot 116 provided in a horizontally extending arm 118 that extends forwardly from a vertical post 120 rigidly affixed to the base of the instrument. One end of the slot 116 is defined by a vertically extending finger 122 on the horizontal arm 118, said finger having a threaded hole therein adapted to receive a screw 124. One end of the screw 124 is adapted to bear against one side of the extension 114, and press the same against one extremity of the slot 116, thereby locking said seismic mass against movement relative to the base of the instrument.

A flexible strip of metal 126 is attached to the vertical post 120 and extends opposite one face of the seismic mass 88, the free end of said strip 126 being provided with a pad 128 fixedly attached thereto and adapted to bear against the mass 88 to act as a damping means. The pad 128 may be moved out of contact with the mass 88.

A horizontal plate 130 is attached to the upper surface 24 of the base of the instrument, in spaced relation thereto, said plate being supported by a number of bolts 132 that extend through tubular spacing members 134. The bolts 132 are each anchored in the base member 22 and extend through suitable holes provided in the horizontal plate 130. The horizontal plate 130 is held in place by nuts 136 screwed onto the ends of the respective bolts 132.

A supply spool 138 has its opposite ends rotatably attached to the horizontal plate 130 and the base member 22 respectively, and is removable from its location therebetween so as to facilitate assembly of a supply of heat sensitive recording paper 139 thereon. A take-up spool 140 is likewise rotatably attached to both the horizontal plate 130 and the upper surface of base member 22 and is also removable from its location therebetween, so as to facilitate removal of paper 139 that has been taken onto said takeup spool 140. As can be seen in Fig. 1, the paper 139 extends from the supply spool 138 toward the take-up spool 140, across a prism shaped member 142 having a knife-edge 141. The prism shaped member 142 is fixed at its opposite ends to the upper surface 24 of the base member 22 and the under surface of the horizontal plate 130.

The lower end of each spool 138 and 140 is provided with a stud that extends into the upper portion of the base 22, in rotatable relation thereto, and is removable from said base. The take-up spool 140 is driven by a motor 143 of suitable size and speed located within the base 22 and drivingly connected to said spool. The spools 138 and 140 are removable from the instrument. A nut 144 is threaded onto the horizontal plate 130 and has an unthreaded stud portion that extends into an axially located opening in each of said spools, whereby the removal of said respective nuts 144 from the horizontal plate 130 will allow removal of the spools 138 and 140 from the instrument.

As can be seen in Fig. 2, a vertical plate 146, having its opposite horizontal edges connected to the horizontal plate 130 and the horizontal surface 24 respectively, is located in the space between the prism shaped member 142 and the take-up spool 140. The recording paper 139 passes in front of the plate 146 in close contact therewith, so that notations can be made on said paper while it is still on the instrument, using said plate as a back-stop.

Each of the seismic masses 32 and 88 is connected to means whereby the movement of each mass may be recorded on the heat sensitive recording paper 139. The vertically movable seismic mass 32 has an extension member 148 connected to the rear face thereof, said extension member having a longitudinal slot 149 therein. A flexure member 150 is adjustably connected to the extension member 148 and extends upwardly therefrom. The flexure 150 has a stud movably carried in slot 149; the lower end of the stud carries a nut that abuts against the lower side of extension 148, whereby said extension is clamped between said nut and the lower end of the flexure 150. The uppermost end of the flexure 150 has a rod member 152 extending upwardly therefrom and rigidly attached thereto. The rod 152, in turn, has a second flexure member 154 fixedly attached to the upper end thereof, the other end of said flexure member 154 being fixedly attached to a horizontal lever 156. Intermediate the ends of the horizontal lever 156, and nearest its left hand end, said lever has connected thereto, a downwardly extending flexure member 158 similar in size and shape to the flexure members previously described. The flexure 158 has its opposite end adjustably attached to a forwardly extending arm 160 that extends from a vertical post 162 fixedly mounted on the base member 22. The arm 160 has a longitudinal slot 159 therein, and the flexure 158 is adjustably connected to said arm 160 in the same manner that the flexure 150 is connected to the extension 148. To the left of the flexure 158, as viewed in Fig. 1, the lever 156 has a counter weight 164 adjustably attached thereto.

A heated pen 168 is attached to the right hand end of lever 156. The pen 168 is composed of a pair of tubular members 170 having their respective left hand ends attached to a cross member 172 which in turn is fixedly attached to the horizontal lever 156. A thin wire 174 is attached, by soldering or the like, to the right hand end of each tubular member 170; said wires are in turn connected to a stylus 176 that will become hot upon the passage of electricity therethrough. Electrical leads 178 connect the respective tubular members 170, and hence the stylus 176, to a suitable source of electrical energy adapted to provide the current necessary to heat said stylus 176.

By virtue of the adjustable connection between the flexure 150 and the horizontal extension 148, and between the flexure 158 and the forwardly extending finger 160, it is possible to adjust the stylus 176 relative to the knife edge 141, thereby adjusting the amount of friction between said stylus and the heat sensitive recording paper 139. The heat of the stylus causes a black mark to be formed on the heat sensitive paper 139 as said stylus slides on the surface thereof.

The horizontally movable seismic mass 88 has a forwardly extending member 180 attached to the front face thereof, said extension 180 having a longitudinal slot 181 formed therein. A flexure 182 is fixedly, though adjustably, attached to the extension 180 in the same manner that flexures 150 and 158 are attached to supports 148 and 160 respectively. The opposite end of the flexure 182 has a rod member 184 connected thereto and extending toward the right of the instrument, as viewed in Fig. 1. The rod member 184 has another flexure member 186 fixedly attached to its right hand end. The right hand end of flexure 186 is attached to a vertical member 188 that is provided with an arm 190 extending from the left side thereof, adjacent the lower end thereof.

The arm 190 has a flexure member 192 attached thereto and extending from the lower side thereof. The lower end of the flexure member 192 is fixedly, though adjustably, attached to a forwardly extending finger 194 on vertical post 162, said finger 194 having a slot 195 therein that extends longitudinally thereof. The end of the flexure 192 that is attached to the finger 194 may be adjusted relative to said finger 194 in the same manner that the other flexures are adjustable relative to the respective supports 148, 160 and 180. The lower end of the vertical member 188 is provided with an integrally formed extension 197 that extends to the right thereof. A heated pen 196, is attached to the free end of the extension 197, and is substantially the same as the pen 168, except that it is longer. The pen 196 comprises tubular members 170, the same as those previously set forth in connection with pen 168. The stylus 177 at the end of pen 196 is heated in the same manner as the stylus at the end of pen 168, namely by being connected to a suitable source of electrical energy.

It is pointed out that the stylus 177 bears against the knife edge 141 in the same manner as the previously described stylus 176, and operates in the same manner. The pressure of the stylus 177 against the knife edge 141 may be adjusted by adjusting the position of flexures 182 and 192 relative to their respective supports 180 and 194 in the manner described above.

In order that the operator of the pallograph may obtain information as to the number of vibrations per unit time, a means is provided for placing a mark on the paper 139 at fixed intervals of time as it is fed through said pallograph. The timing means comprises a synchronous motor 198 attached to the upper side of the horizontal plate 130, said motor having a drive shaft 200 extending downwardly thereof. The free end of the drive shaft 200 has a cam member 202 attached thereto. A vertical plate member 204 has one end thereof fixedly attached to the forward edge of plate 130 and extends downwardly therefrom. A bell-crank 206 is pivotally connected to the plate 204 by a screw 210 of suitable type; said bell-crank 206 being composed of a vertically extending arm 208 having one edge thereof adapted to bear against the peripheral edge of the cam 202, and a pair of horizontally extending arms 211 and 214. The horizontal arm 211 extends to the left of the pivot 210 and has attached thereto a heated stylus member 212 substantially the same in structure and operation as the stylus members 176 and 177, said stylus 212 being heated by a suitable source of electrical energy. The second horizontally extending arm 214 has its lower edge in contact with a leaf spring 216 fixedly connected to the plate 204 and is adapted to force said bell-crank 206 in a counterclockwise direction, whereby one edge of the vertically extending arm 208 is forced into continual contact with the cam 202. As the cam 202 rotates, it causes the bell-crank 206 to oscillate about pivot 210, thereby causing periodic vertical movements of the stylus 212 along the surface of the paper 139, which in turn leaves a vertical mark on said heat sensitive paper at given intervals of time. It is pointed out that even though the speed of the paper may vary from time to time, the varying distance between successive vertical marks, left by stylus 212, will represent the same interval of time since said stylus oscillates at a fixed frequency.

Figure 11:
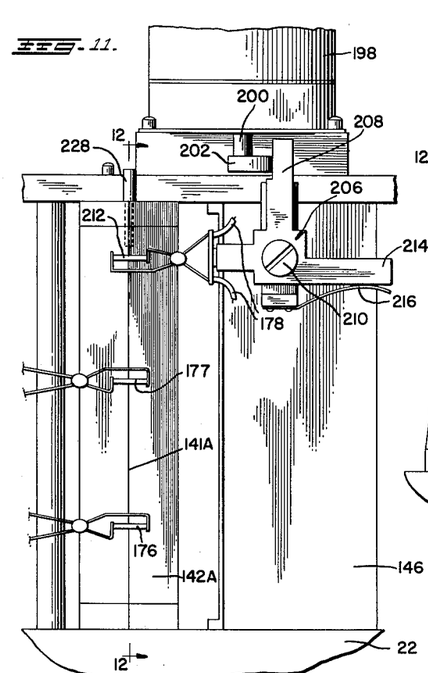
Fig. 11 is an enlarged view of a portion of the structure shown in Fig. 1.
Figure 12:
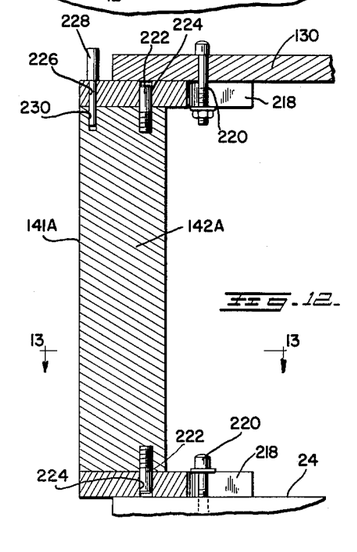
Fig. 12 is a view taken on line 12—12 of Fig. 11.
Figure 13:
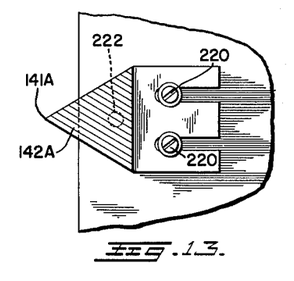
Fig. 13 is a sectional view taken on line 13—13 of Fig. 12.

Attention is directed to Figs. 11, 12 and 13, wherein is disclosed a modification of that portion of the invention pertaining to the prism structure 142 against which the styli are adapted to bear. In accordance with this modification each of a pair of plates 218, having a triangularly shaped forward portion, is adjustably attached to the horizontal plate 130 and the upper surface 24 of the base 22 respectively. Each of the plates 218 is adjustably clamped to its respective supporting member by a pair of nuts and bolts 220, whereby each of said plates 218 may be moved either forwardly or rearwardly of the forward portion of the instrument.

A modified prism member 142A is pivotally attached at its respective ends to the plate members 218. The prism 142A has a stud member 222 extending from its upper and lower ends respectively, each stud member 222 being located adjacent the rear wall of the prism member, intermediate the opposite side edges of the rear face of said prism. Each of the studs 222 is rotatably mounted within a hole 224 provided in each of the plates 218. The uppermost plate 218 has a hole 226 therein, into which is removably inserted a pin 228 of a length sufficient to extend into a hole 230 provided in the upper end of the prism 142A. The holes 226 and 230 are adapted to be aligned when the prism 142A is suitably rotated about the axis of studs 222. The prism 142A is locked against movement relative to the frame of the instrument by inserting pin 228 into the aligned holes 226 and 230.

This modification of the invention facilitates threading of the paper 139 through the instrument, past the respective styli. After removing the pin 228 from the holes 226 and 230, the prism 142A is rotated so that a flat face thereof, instead of the knife edge 141A is opposite the styli, thereby eliminating the necessity of pulling the styli and their respective supports forwardly from the knife edge 141A in order to thread the paper across said edge. After the paper has been suitably threaded through the instrument and fastened to the take-up spool 140, the prism 142A is rotated once again so as to realign the holes 226 and 230, and the locking pin 228 is inserted into said holes. At this point the knife-edge 141A is so located that the styli 176, 177 and 212 each bear against said edge.

Figures 3, 14:
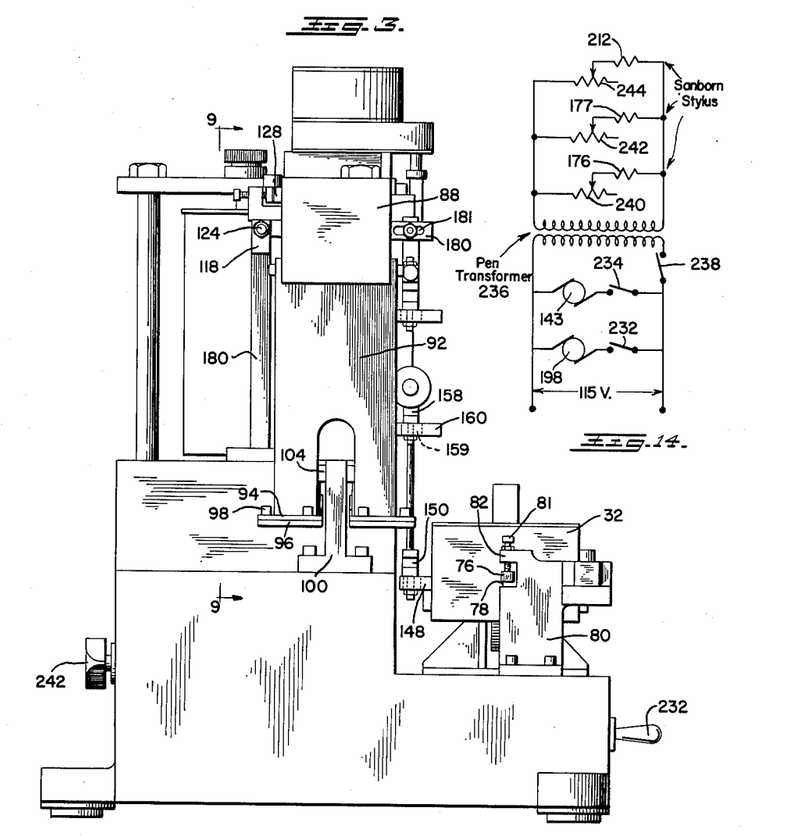
Fig. 3 is a side elevational view of the pallograph looking from the left in Fig. 1.
Fig. 14 is a wiring diagram of the electrical circuitry utilized in conjunction with the pallograph.

Fig. 14 shows a wiring diagram of the electrical system utilized in conjunction with the instant invention. In accordance with the preferred embodiment, the timer motor 198 and the paper drive motor 143 are each connected directly across a 115 volt line, said motors being provided with respective switches 232 and 234 which are located on the front of the pallograph 20. The primary of a step-down transformer 236 is connected in parallel with the motors 198 and 143, while the secondary of said transformer is connected in parallel with three rheostats 240, 242 and 244, which in turn are connected in series with the respective styli 176, 177 and 212. A switch 238 is provided for connecting the primary of the transformer to the 115 volt line thereby allowing current to flow to the respective styli, causing them to become heated.

Thus it is seen that by this invention the applicants have developed a pallograph capable of simultaneously measuring and recording vibrations in both a vertical and a horizontal plane, the instrument being so constructed that the magnitude, the frequency of the vibrations and the relative magnitudes of the vibrations may be observed. This instrument also makes it possible to resolve vibrations, that are at an angle to the base of the instrument, into their respective horizontal and vertical components.

What is claimed is:

A vibration measuring and recording instrument for measuring and recording steady state vibrations comprising, a base member, a substantially horizontal lever having one end thereof pivotally connected to said base by means of a plurality of flexure members having their respective ends attached to said lever and said base, a first seismic mass fixedly connected to the opposite end of said horizontal lever, a substantially vertical post having one end pivotally connected to said base by means of a plurality of flexure members having their respective ends attached to said base and said post respectively, a second seismic mass fixedly attached to said post adjacent the other end thereof, said first and second seismic masses being adapted respectively to respond to vertical and horizontal steady state vibrations; a record receiving tape movably mounted on said base, means for moving said tape at a substantially constant speed, a first scriber supporting lever pivotally connected to said base by a frictionless flexure member having its opposite ends connected to said base and said first supporting lever respectively, a scriber fixedly attached to said first scriber supporting lever and in scribing contact with said tape, linkage means pivotally connecting said first scriber supporting lever to said first seismic mass by means of frictionless flexure members, a second scriber supporting lever pivotally connected to said base by a frictionless flexure member having its opposite ends connected to said base and said second supporting lever respectively, a scriber fixedly attached to said second scriber supporting lever and in scribing contact with the tape, linkage means pivotally connecting said second scriber supporting lever to said second seismic mass by means of frictionless flexure members, whereby movement of said seismic masses imparts movement to said first and second scribers respectively, thereby rendering the vibration measuring and recording instrument capable of producing a record of vertical and horizontal steady state vibrations to which the instrument may be subjected; and means for adjusting the first and second scriber supporting levers and the linkage means interconnecting said levers and the respective seismic masses relative to said base member and said respective seismic masses in a manner whereby the pressure of said respective scribers against the record receiving tape may be adjusted.

References Cited in the file of this patent

UNITED STATES PATENTS

| | | |
|---|---|---|
| 1,745,522 | Baskerville | Feb. 4, 1930 |
| 2,393,069 | Rushing et al. | Jan. 15, 1946 |
| 2,414,976 | Redhed | Jan. 28, 1947 |
| 2,578,803 | Holmberg et al. | Dec. 18, 1951 |
| 2,777,747 | Gilson et al. | Jan. 15, 1957 |